(12) United States Patent
McClean et al.

(10) Patent No.: US 7,317,570 B2
(45) Date of Patent: Jan. 8, 2008

(54) VARIABLE GAIN OPTICAL AMPLIFIERS

(75) Inventors: Ian Peter McClean, Devon (GB);
Stephen David Fourte, Devon (GB);
Jonathon Stuart Drake, Devon (GB);
Barrie Flintham, Devon (GB)

(73) Assignee: Bookham Technology plc,
Northamptonshire (GB)

( * ) Notice: Subject to any disclaimer, the term of this patent is extended or adjusted under 35 U.S.C. 154(b) by 0 days.

(21) Appl. No.: 11/382,974

(22) Filed: May 12, 2006

(65) Prior Publication Data

US 2007/0264014 A1  Nov. 15, 2007

(51) Int. Cl.
*H01S 4/00* (2006.01)
*H04B 10/12* (2006.01)

(52) U.S. Cl. ............................... 359/341.41
(58) Field of Classification Search ............ 359/341.41
See application file for complete search history.

(56) References Cited

U.S. PATENT DOCUMENTS

| | | | |
|---|---|---|---|
| 6,168,850 B1 | 1/2001 | Kim et al. | |
| 6,246,514 B1 | 6/2001 | Bonnedal et al. | |
| 6,366,395 B1 * | 4/2002 | Drake et al. | 359/341.41 |
| 6,377,394 B1 * | 4/2002 | Drake et al. | 359/341.41 |
| 6,414,788 B1 | 7/2002 | Ye et al. | |
| 6,417,965 B1 | 7/2002 | Ye et al. | |
| 6,522,460 B2 | 2/2003 | Bonnedal et al. | |
| 6,580,553 B2 * | 6/2003 | Kim et al. | 359/341.41 |
| 6,900,934 B2 * | 5/2005 | Lelic | 359/341.41 |
| 6,975,449 B1 | 12/2005 | Mok et al. | |
| 7,061,668 B2 * | 6/2006 | Maurer et al. | 359/341.41 |
| 2004/0051938 A1 * | 3/2004 | Chan et al. | 359/337.1 |
| 2004/0240044 A1 * | 12/2004 | Park et al. | 359/341.41 |
| 2005/0248833 A1 * | 11/2005 | Folurte et al. | 359/337.13 |

* cited by examiner

*Primary Examiner*—Jack Keith
*Assistant Examiner*—Eric Bolda
(74) *Attorney, Agent, or Firm*—Renner, Otto, Boisselle & Sklar, LLP (57) ABSTRACT

A variable gain optical amplifier comprises an EDFA for amplifying optical signals at different wavelengths and a pump driver 14 for optically pumping the EDFA to provide optical gain. An input detector 2 is provided for monitoring the power $P_{in}$ of input signals to the EDFA, and an output detector 3 is provided for monitoring the power $P_{out}$ of output signals from the EDFA. A gain control arrangement is provided for supplying a drive signal to the pump driver 14 to control the optical gain including a feed forward arrangement 20, 21, 22, 23 for supplying a feed forward signal dependent on the monitored input power $P_{in}$, and a feed back arrangement 5, 6, 7, 8, 9, 30 for supplying a feed back signal dependent on the monitored output power $P_{out}$. In order to ensure rapid gain control the feed back arrangement comprises an adaptive proportional-integral (PI or PID) controller 30 for controlling the optical gain at a required gain set point in accordance with proportional and integral control coefficients $K_p$ and $K_i$ corresponding to a required gain profile, at least one of which is dynamically variable in dependence on the monitored output power $P_{out}$, the output signal from the controller 30 and the feed forward signal being added in an adder 31 to produce the drive signal for the pump driver 14.

15 Claims, 9 Drawing Sheets

Continuous Time Domain $$Pd(t) = FF(t) + K_p\, e(t) + K_i \int_0^t e(t)\,dt + K_d \frac{d\,e(t)}{dt}$$

Discrete/Digital Domain $$Pd(t) = FF(t) + K_p\, e(t) + K_i \Delta t \sum_{i=1}^{n} e(i) + K_d \frac{(e(t)-e(t-\Delta t))}{\Delta t}$$

Kp is Proportional Gain Coefficient
Ki is Integral Gain Coefficient
Kd is Differential Gain Coefficient
Δt is the sampling period

Fig. 9

VARIABLE GAIN OPTICAL AMPLIFIERS

This invention relates to variable gain optical amplifiers and is concerned more particularly, but not exclusively, with erbium doped fibre amplifiers (EDFAs).

BACKGROUND OF THE INVENTION

In optical networks that use dense wavelength division multiplexing (DWDM), multiple wavelengths of light are used to support multiple communications channels on a single fibre. Optical amplifiers are used in such networks to amplify optical signals that have been subject to attenuation over multi-kilometre fibre-optic links. A typical amplifier may include EDFA components that are pumped with diode lasers. The EDFA stages increase the strength of the optical signals being transmitted over the fibre-optic links. It is known for such amplifiers to include automatic gain control (AGC) for providing a constant gain regardless of variation in the input power and the wavelength composition of the amplifier input.

The gain of EDFA stages depends on the inversion level of erbium ions in the fibre. If, for example, the inversion level of a given stage is high, the gain of the stage will be high. If the inversion level of a stage is low, the gain of the stage will be low. Unless control electronics are used to maintain a steady inversion level under various operating conditions, the gain of EDFA stages will be subject to unacceptable transients. Gain transients in an amplifier may cause fluctuations in the power of the output signals from the amplifier. If the output signals are too weak, it may not be possible to detect the signals. If the output signals are too strong, the signals may be subject to nonlinear optical effects in the fibre.

Figure 1:
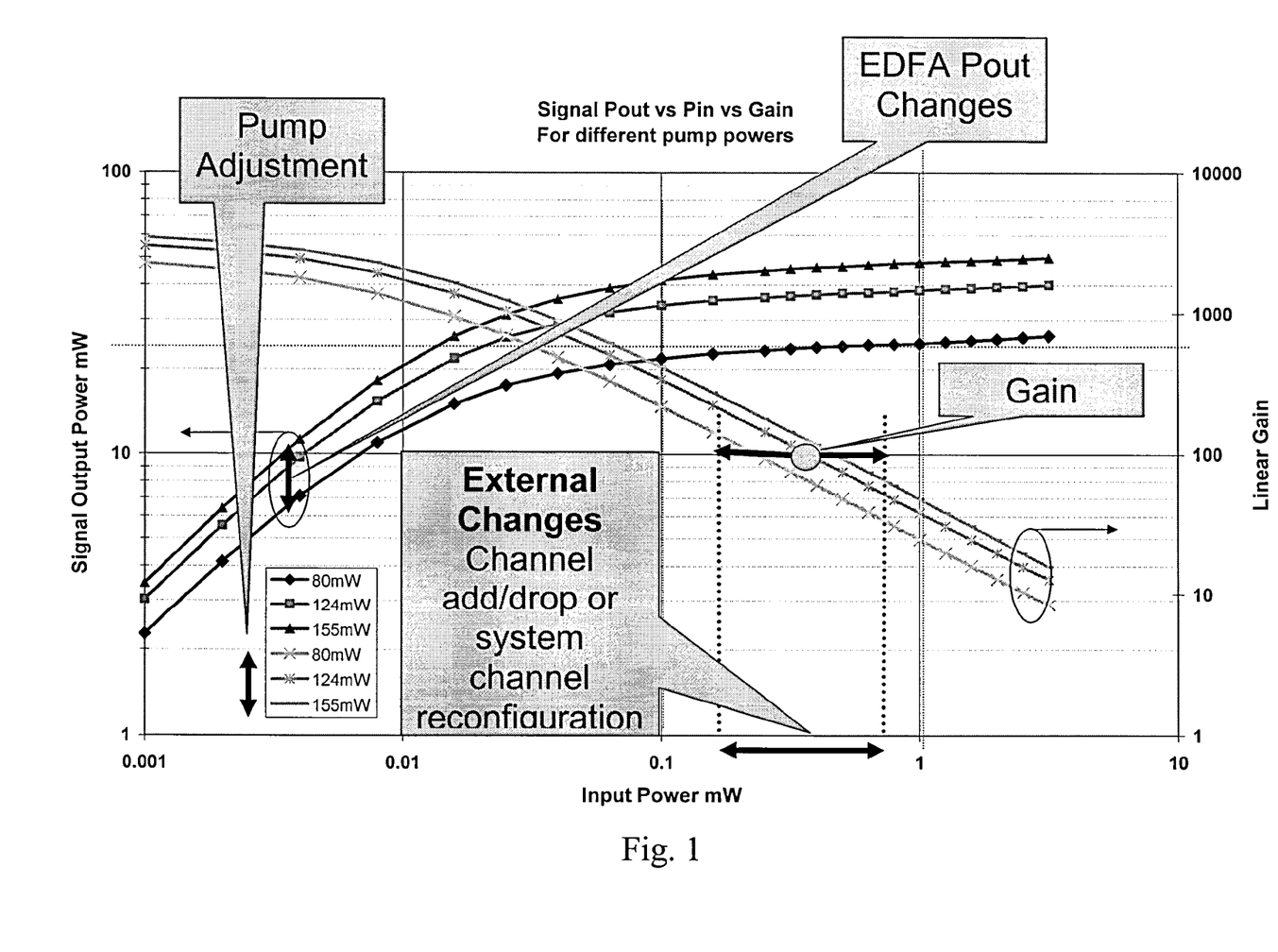
FIG. 1 is a graph illustrating variation of input and output power values with gain for different pump powers of an ideal optical amplifier.

The graph of FIG. 1 illustrates the variation of the input and output power values with gain for different pump powers of an ideal optical amplifier. A key is shown of the different curves denoting variation of the output pump power $P_{out}$ with the input pump power $P_{in}$ for pump powers of 80 mW, 124 mW and 155 mW respectively, and of the different curves denoting variation of the input pump power $P_{in}$ with linear gain for pump powers of 80 mW, 124 mW, and 155 mW respectively. This shows that the gain profile of the amplifier varies with the pump drive conditions, and therefore that external conditions, such as the adding or dropping of channels, can result in undesirable power transients.

Figure 2:
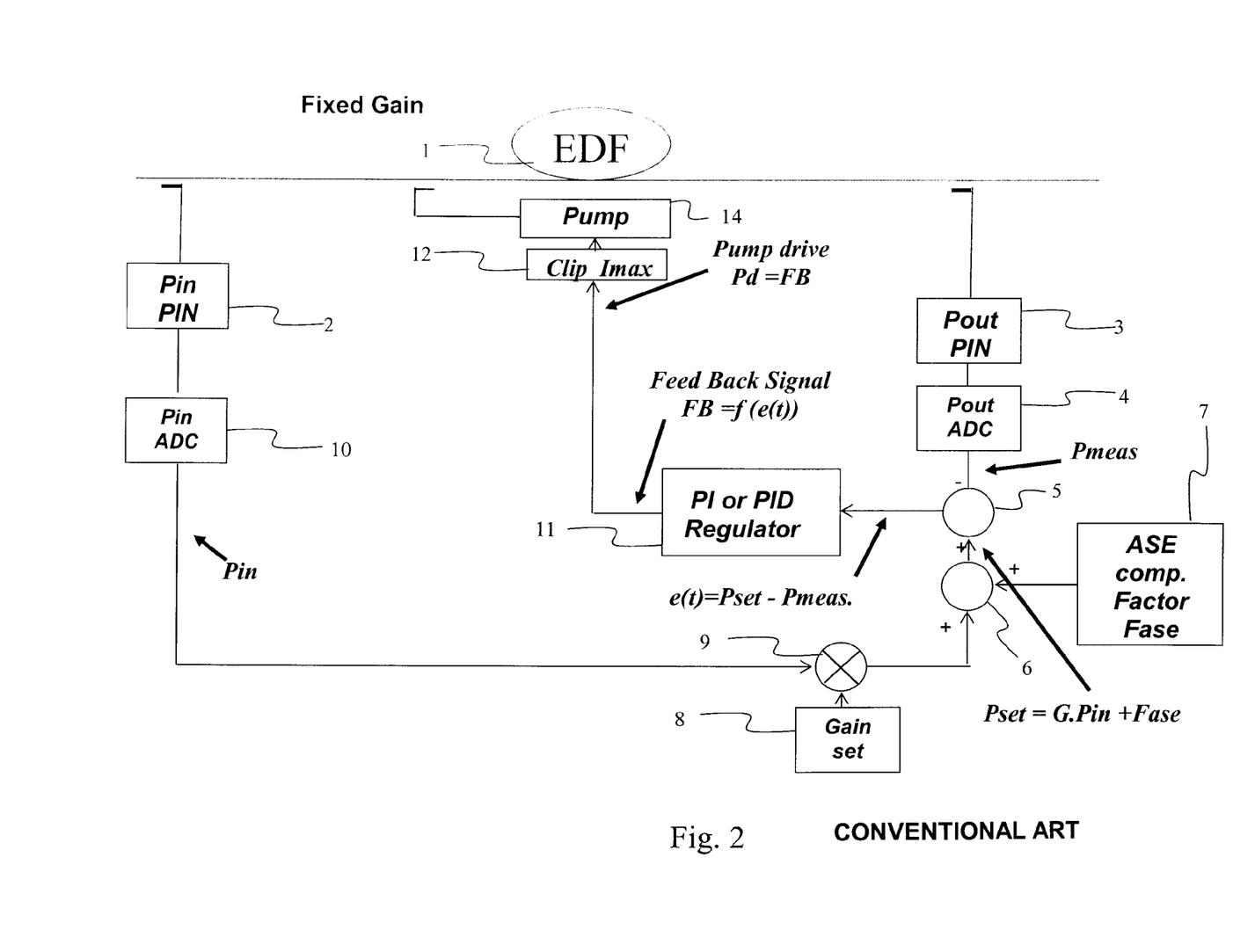
FIGS. 2 and 3 are diagrams of known AGCs of optical amplifiers.

FIG. 2 shows a known AGC for a fixed gain EDFA in which an input power detector 2 is provided in the form of a tap-off coupler for monitoring the power $P_{in}$ of an input signal to the EDF 1, and an output power detector 3 is provided in the form of a tap-off coupler for monitoring the power $P_{out}$ of an output signal from the EDF 1. The output signal from the output power detector 3 is supplied to an analogue-to-digital converter (ADC) 4 which in turn supplies an output signal $P_{meas}$ indicative of the measured power output signal to one input of a comparator 5. A signal $P_{set}$ indicative of the target power output is supplied to another input of the comparator 5, this signal being calculated by adding together in an adder 6 a signal $F_{ase}$ from an ASE compensator 7 indicative of a compensating factor for compensating for the effect of ASE noise in the amplifier and a signal $G.P_{in}$ supplied by a multiplier 9 which is the product of a signal G indicative of the target gain from a gain setter 8 and a signal $P_{in}$ supplied by an ADC 10 connected to the output of the input power detector 2.

The error signal e(t) that is the difference between the two input signals supplied to the comparator 5 is supplied to a PI or PID regulator 11 which in turn supplies a feed back signal FB which is a function of the error signal e(t), by way of a current limiter 12 for clipping the maximum current $I_{max}$, as a pump drive signal to the pump driver 14. Such a known AGC suffers from the main limitation in use that it has too slow a response time with the result that, for example, a required adjustment of the pump drive current occurs a significant length of time after the triggering increase in the output power and undesirable output power transients are produced.

Figure 3:
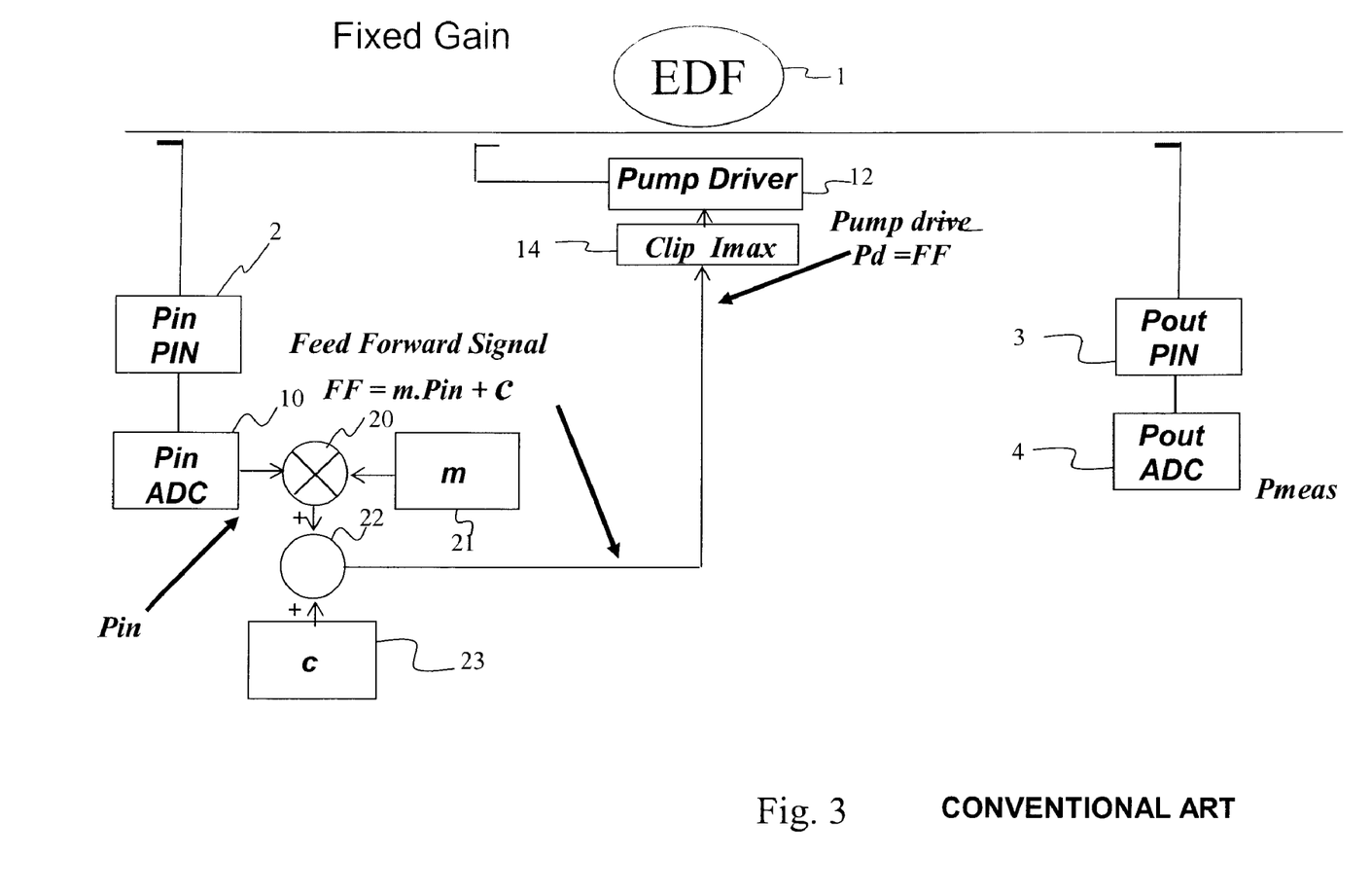

FIG. 3 shows an alternative known AGC for a fixed gain EDFA in which an input power detector 2 is again provided in the form of a tap-off coupler for monitoring the power $P_{in}$ of an input signal to the EDF 1, and the output of the input power detector 2 is connected to an ADC 10. The output signal $P_{in}$ from the ADC 10 is applied to one input of a multiplier 20 to another input of which a target gain signal m from a gain setter 21 is applied. The output signal from the multiplier 20 is applied to one input of an adder 22 to another input of which a constant offset signal c from an offset setter 23 is applied. This provides a feed forward signal $FF=m.P_{in}+c$ that is supplied, by way of a current limiter 12 for clipping the maximum current $I_{max}$, as a pump drive signal to the pump driver 14. Such a known AGC suffers from the main limitation in use that it is inaccurate, although it has a much quicker response time than the AGC with feed back control described above with reference to FIG. 2. In particular such a known AGC does not provide temperature or aging compensation with the result that undesirable gain and transient control errors are produced.

U.S. Pat. No. 6,414,788 discloses an AGC for a fixed gain EDFA that combines the feed back control described above with reference to FIG. 2 with the feed forward control described above with reference to FIG. 3. This enables the advantage of the rapid response time provided by the feed forward control of FIG. 3 to be combined with the advantage of greater accuracy of the feed back control of FIG. 2. However such an AGC is limited generally to a fixed gain condition. In such an AGC, the coefficient of the control loop is set to a fixed value determined either by the design or empirically, and would not be changed during a gain set point change.

U.S. Pat. No. 6,975,449 discloses an AGC based on adaptive feed back that dynamically adjusts at least one of the control coefficients in relation to the measured output power. In this case a set point gain change as demanded by the variable gain amplifier (VGA) will change the measured power condition and change the control coefficients accordingly. However the lack of a suitable feed forward scheme limits the speed of response in this approach.

U.S. Pat. No. 6,522,460 discloses a power controller that effectively combines the feed back control described above with reference to FIG. 2 with the feed forward control described above with reference to FIG. 3. However such a device is incapable of being used as an AGC as control is effected on the basis of a target power output $P_{set}$ rather than on the basis of a target gain.

It is an object of the present invention to provide a variable gain optical amplifier in which gain transients are accurately and rapidly controlled for a range of gain conditions.

SUMMARY OF THE INVENTION

According to the present invention there is provided a variable gain optical amplifier comprising:

amplifying means for amplifying optical signals at different wavelengths in a fiber-optic communications link, the amplifying means being in the form of a pump driver for optically pumping an optical fiber to provide optical gain;

input power detection means for monitoring the power $P_{in}$ of input signals to the amplifying means;

output power detection means for monitoring the power $P_{out}$ of output signals from the amplifying means;

gain control means for supplying a drive signal to the pump driver to control the optical gain;

feed forward means for supplying a feed forward signal to the gain control means dependent on the monitored input power $P_{in}$; and feed back means for supplying a Feed back signal to the gain control means dependent on the monitored output power $P_{out}$;

wherein the feed back means comprises an adaptive proportional-integral (PI or PID) controller for controlling the optical gain at a required gain set point in accordance with proportional and integral control coefficients $K_p$ and $K_i$ corresponding to a target gain profile, at least one of which is dynamically variable in dependence on the monitored output power $P_{out}$, and the gain control means is adapted to combine the feed forward signal supplied by the feed forward means with the feed back signal supplied by the feed back means to produce the drive signal for the pump driver.

Such an adaptive PI controller enables the control loop to be controlled automatically in dependence on the gain condition that the VGA is in, and the AGC is accordingly particularly well adapted to provide automatic gain control in VGAs and EDFAs for use in optical communication systems.

In a preferred implementation the feed back means is adapted to compare the monitored output power $P_{out}$ to a set output power value $P_{set}$ dependent on a variable gain set value and to change the feed back signal in response to a difference between the monitored output power $P_{out}$ and the set output power value $P_{set}$.

Furthermore the feed forward means is preferably adapted to supply a feed forward signal dependent on a variable target gain value $G_{set}$ supplied to the amplifier. In this case the feed forward means may be adapted to supply a feed forward signal from a look-up table or suitable algorithm selected on the basis of the variable target gain target value $G_{set}$.

Furthermore the feed forward means is preferably adapted to supply a feed forward signal dependent on a variable target ASE compensation value $F_{ase}$ supplied to the amplifier. In this case the feed forward means may be adapted to supply a feed forward signal from a look-up table or suitable algorithm selected on the basis of the variable target ASE compensation value $F_{ase}$.

In addition the feed forward means may be adapted to supply a feed forward signal dependent on a detected temperature value T.

In one embodiment of the invention the feed forward means includes variable filter means for adjusting a digital sampling rate of the feed forward signal. Also the feed back means may include variable filter means for adjusting a digital sampling rate of the feed back signal. The filter means can be used to control the aggressiveness of the feed forward signal, and/or to filter out noise from the components contributing to the feed back signal and so as to match the sampling rate of the input to the feed back control in order to prevent aliasing.

In one embodiment of the invention the feed forward means includes a logarithmic amplifier for supplying a feed forward signal dependent on the logarithm of the monitored input power $P_{in}$. This provides a considerable increase in the dynamic range that can be covered by a single amplifier. Also the feed back means may include a logarithmic amplifier for supplying a feed back signal dependent on the logarithm of the monitored output power $P_{out}$.

Typically the amplifying means will include at least one erbium-doped fibre loop and at least one pump laser diode, although the invention can also be applied to other forms of optical amplifier.

BRIEF DESCRIPTION OF THE DRAWINGS

In order that the invention may be more fully understood, a preferred embodiment of optical amplifier in accordance with the invention will now be described, by way of example, with reference to the accompanying drawings, in which.

DETAILED DESCRIPTION OF THE DRAWINGS

Each of the embodiments of the invention to be described below is applied to an EDF loop amplifier comprising one or more EDF loops. The or each EDF loop 1 is supplied with pump light from a pump driver in the form of a laser diode 4 under the control of an AGC. If required more than one laser diode may be provided for pumping the or each EDF loop, and/or additional loops and associated pump laser diodes may be provided. The pump stages are controlled in response to receipt by the AGC of electrical detection signals from input and output power detectors 2 and 3 in the form of photodiodes and associated tap-off couplers for monitoring the input and output powers $P_{in}$ and $P_{out}$ of the amplifier.

Figure 4:
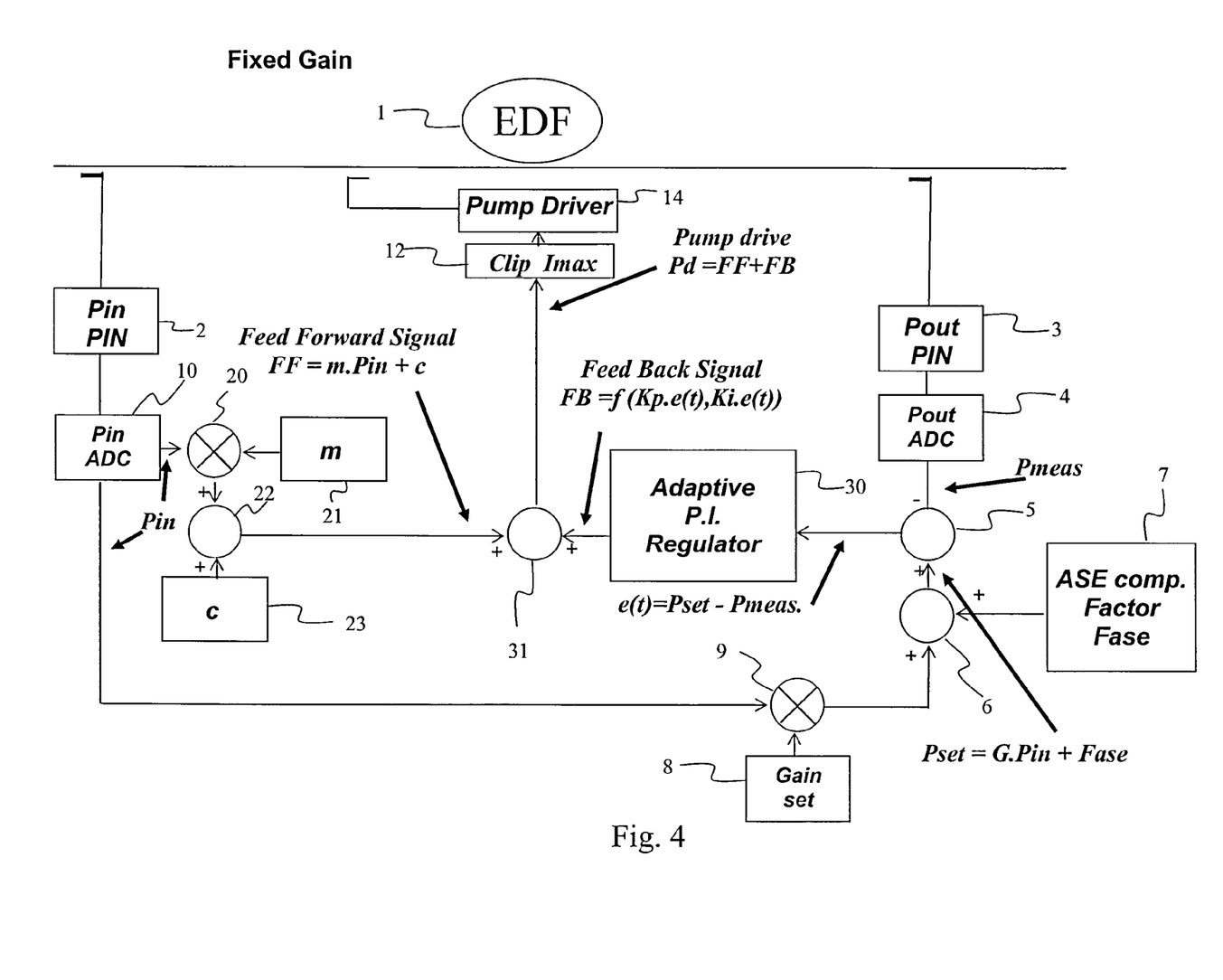
FIGS. 4 to 8 are diagrams of AGCs of preferred embodiments of optical amplifier in accordance with the present invention.

Considering first the embodiment of FIG. 4, the output signal from the output power detector 3 is supplied to an ADC 4 which in turn supplies an output signal $P_{meas}$ indicative of the measured power output signal to one input of a comparator 5, as in the AGC of FIG. 2. A signal $P_{set}$ indicative of the target power output is supplied to another input of the comparator 5, this signal being calculated by adding together in an adder 6 a signal $F_{ase}$ from an ASE compensator 7 indicative of a compensating factor for compensating for the effect of ASE noise in the amplifier and a signal $G.P_{in}$ supplied by a multiplier 9 which is the product of a signal G indicative of the target gain from a gain setter 8 and a signal $P_{in}$ supplied by an ADC 10 connected to the output of the input power detector 2.

The error signal e(t) that is the difference between the two input signals supplied to the comparator 5 is supplied to an adaptive PI regulator 30 which in turn supplies a feed back signal FB which is a function of the error signal e(t) and proportional and integral control coefficients $K_p$ and $K_i$ corresponding to a target gain profile. At least one of the control coefficients $K_p$ and $K_i$ is dynamically variable in dependence on the monitored output power $P_{out}$. The preferred embodiment of the invention overcomes the problem of gain-dependent performance by changing the coefficients of the control loop depending on the gain setting. This enables the required response time to be achieved regardless of the gain setting required.

The feed back signal FB is supplied to one input of an adder 31, the output of which is connected, by way of a current limiter 12, to the pump driver 14. The adaptive PI regulator 30 modifies the control loop in dependence on the gain condition that the amplifier is in.

Furthermore, as in the AGC of FIG. 3, the output signal from the input power detector 2 is connected to an ADC 10. The output signal $P_{in}$ from the ADC 10 is applied to one input of a multiplier 20 to another input of which a target gain signal m from a gain setter 21 is applied. The output signal from the multiplier 20 is applied to one input of an adder 22 to another input of which a constant offset signal c from an offset setter 23 is applied. This provides a feed forward signal $FF=m.P_{in}+c$ that is supplied to another input of the adder 31, so that the output signal from the adder 31 for controlling the pump current is the sum of the feed back signal FB and feed forward signal FF. Such an AGC in accordance with the invention combines the rapid response time provided by feed forward signal FF with the high control accuracy provided by feed back signal FB in a VGA such that gain transients are accurately controlled for a range of gain conditions.

Figure 5:
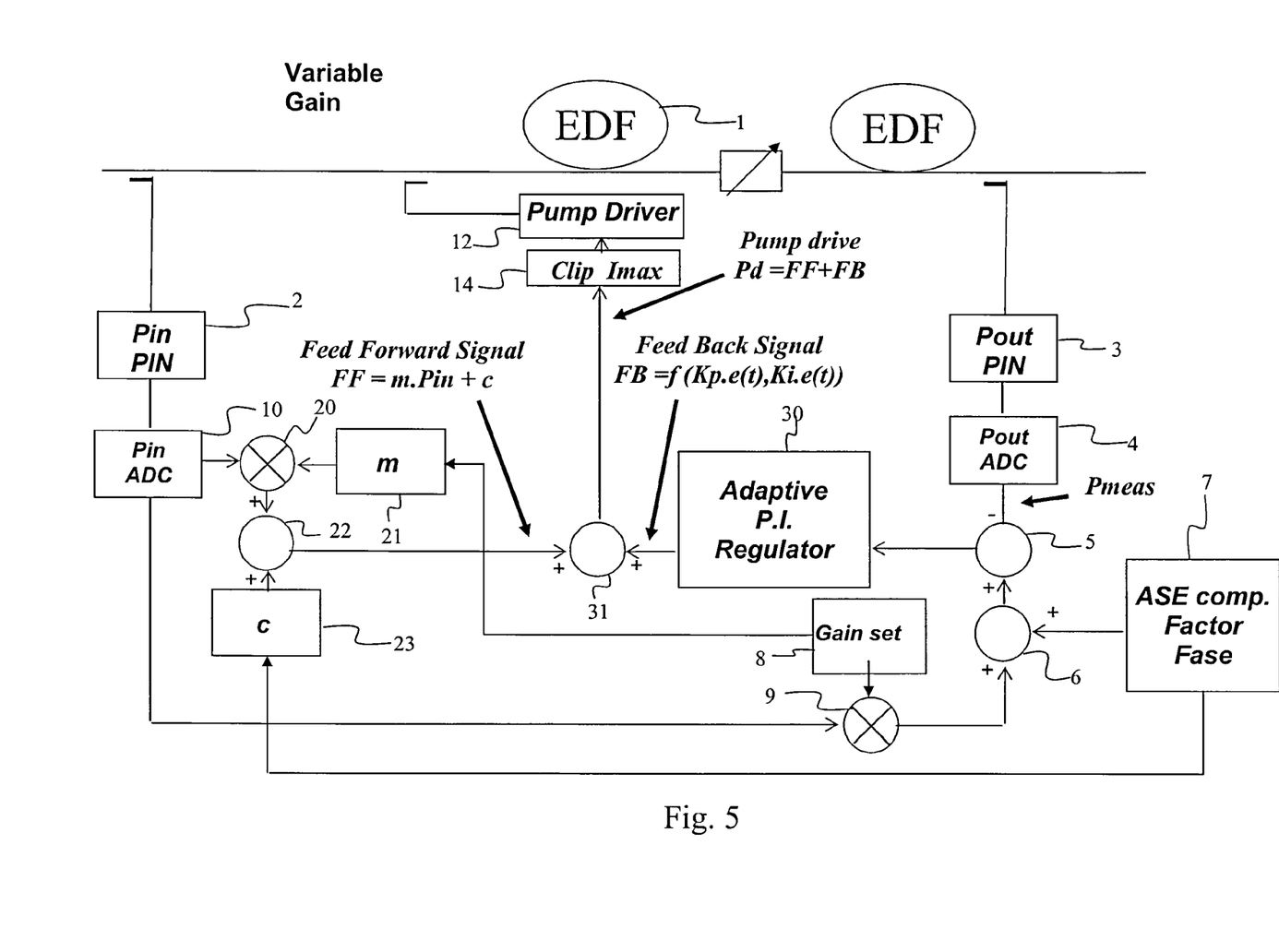

Considering now the embodiment of FIG. 5, this is generally similar to the embodiment of FIG. 4 but with the addition of the features that (i) the gain setter 21 is linked to the gain setter 8 such that the target gain signal m applied to one input of the multiplier 20 is rendered dependent on the target gain, and (ii) the offset setter 23 is linked to the ASE compensator 7 such that constant offset signal c applied to one input of the adder 22 is rendered dependent on the set compensating factor for compensating for the effect of ASE noise in the amplifier which is itself dependent on the target gain (as a result of the calibration procedure). This ensures that the feed forward signal $FF=m.P_{in}+c$ is compensated for variation of the target gain.

Figure 6:
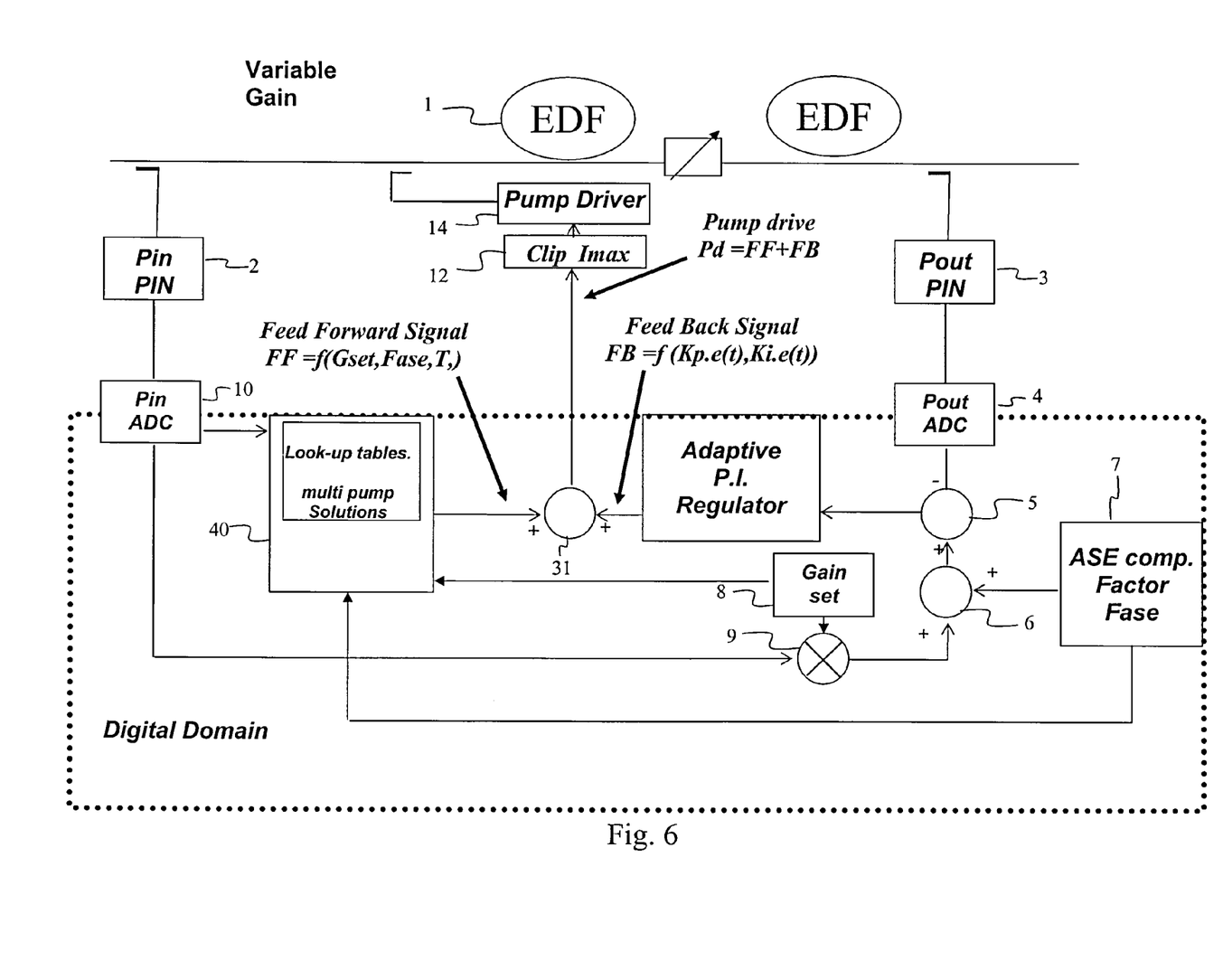

Considering now the embodiment of FIG. 6, this is generally similar to the embodiment of FIG. 5 except that the AGC is shown in the digital domain with the gain compensation of the feed forward signal FF being effected by look-up tables 40 for supplying appropriate look-up values for the feed forward signal FF in dependence on the target gain $G_{set}$, the ASE compensating factor $F_{ase}$ and the temperature T. This embodiment permits adaptation for multiple pump solutions, and takes account of temperature variations, with the result that undesirable gain and transient control errors are avoided.

Figure 7:
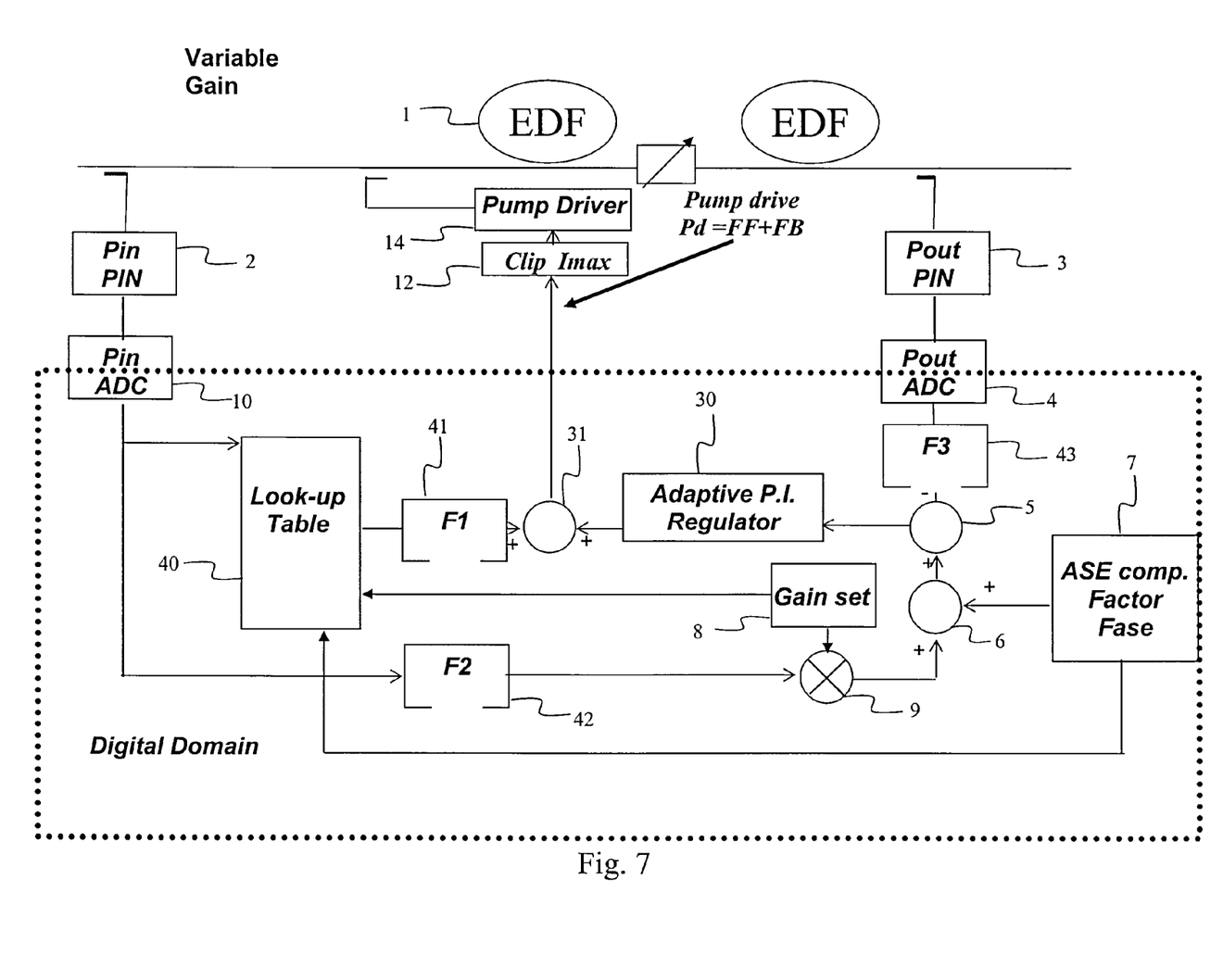

Considering now the embodiment of FIG. 7, this is generally similar to the embodiment of FIG. 6 except that one or more digital filters are provided within the control circuit to effect further control of the feed forward signal FF and/or the feed back signal FB. For example a digital filter 41 can be provided to filter out noise from the feed forward signal FF and so as to enable the characteristics of the feed forward signal FF to be changed depending of the required application, with the filter acting as a high pass filter, a low pass filter or a band pass filter depending on the programmed setting. Such a filter can be used to control the aggressiveness of the feed forward signal, for example to slow down the response time. Additionally a digital filter 42 and a digital filter 43 can be provided to match the sampling rate of the input feed forward signal FF to the sampling rate of the feed back signal FB. Without these filters signal aliasing would occur. They provide the following two benefits in support of the object of rapid gain control:

1) The feed forward loop may be sampled much faster than the feedback loop.

2) After a range change in the case of transimpedance amplifier based solutions, the filter registers may be immediately set to the post switch reading which removes the need for the filter to stabilise after a range change.

Figure 8:
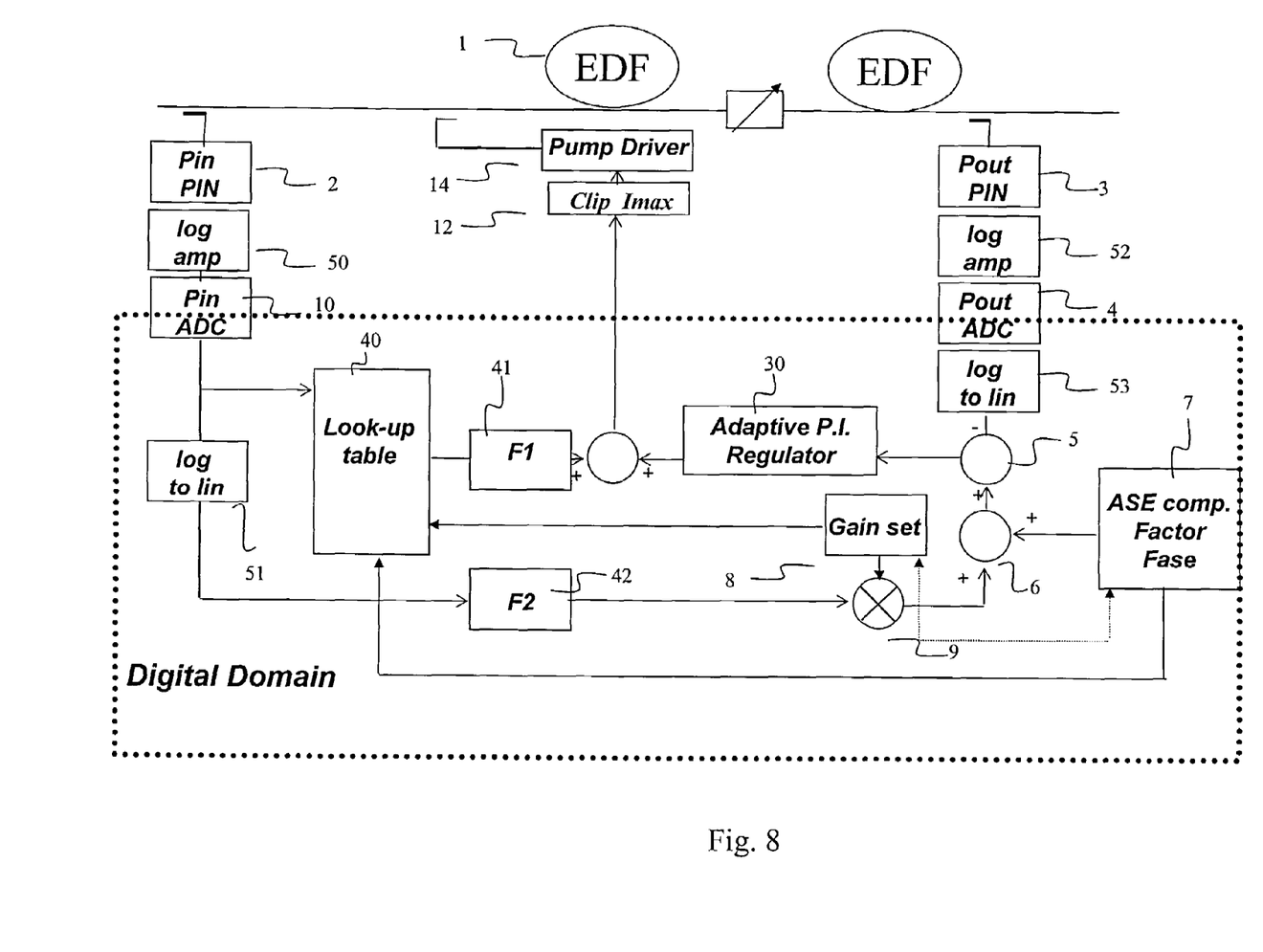

Considering now the embodiment of FIG. 8, this is generally similar to the embodiment of FIG. 7 except that the input power detector 2 includes a logarithmic amplifier 50, in which case a logarithmic-to-linear converter 51 is required in the link to the multiplier 9. This provides a considerable increase in the dynamic range that can be covered by a single amplifier. Optionally the output power detector 3 includes a logarithmic amplifier 52, in which case a logarithmic-to-linear converter 53 is required at the output of the ADC 4, although it is alternatively possible for the output power detector 3 to include a linear transimpedance scheme.

Figure 9:
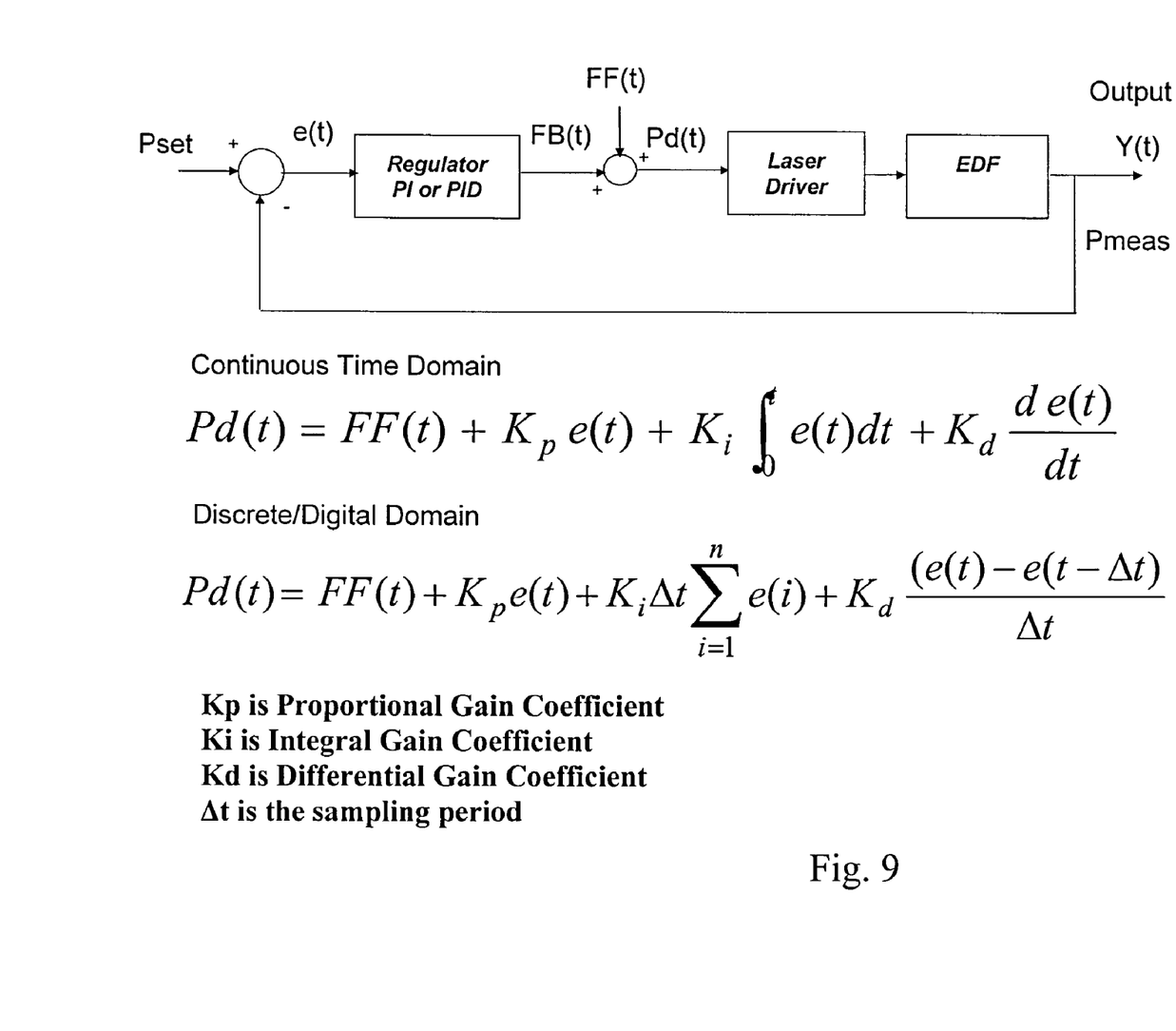
FIG. 9 shows a preferred control algorithm for use with a preferred embodiment of the present invention.

Referring to FIG. 9, a preferred control algorithm is given in both the continuous time domain and the discrete/digital time domain. The control scheme is illustrated in its simplest form where the pump drive response Pd(t) is derived from the sum of the feed forward signal FF(t) and the PI or PID regulator output FB(t). The FF(t) signal is in turn derived from the previously described equation $FF=m.P_{in}+c$. The regulator output FB(t) is derived from the sum of two or three terms representing a proportion, integral and differential response based on the input error signal e(t) in accordance with standard control theory. At least one of the control coefficients is made dependent on the measured output power Pmeas. The error signal is derived from a comparison of the measured output condition Pmeas and a setpoint condition Pset, where Pset is derived from the addition of an ASE compensation factor to the product of the required gain setpoint and the measured input power so as to provide signal gain control.

The invention claimed is:

1. A variable gain optical amplifier comprising:
amplifying means for amplifying optical signals at different wavelengths in a fiber-optic communications link, the amplifying means being in the form of a pump driver for optically pumping an optical fiber to provide optical gain;
input power detection means for monitoring the power $P_{in}$ of input signals to the amplifying means;
output power detection means for monitoring the power $P_{out}$ of output signals from the amplifying means;
gain control means for supplying a drive signal to the pump driver to control the optical gain;
feed forward means for supplying a feed forward signal to the gain control means dependent on the monitored input power $P_{in}$; and
feed back means for supplying a feed back signal to the gain control means dependent on the monitored output power $P_{out}$;
wherein the feed back means comprises an adaptive proportional-integral (PI or PID) controller for controlling the optical gain at a required gain set point in accordance with proportional and integral control coefficients $K_p$ and $K_i$ corresponding to a required gain profile, at least one of which is dynamically variable in dependence on the monitored output power $P_{out}$, and the gain control means is configured to combine the feed forward signal supplied by the feed forward means with the feed back signal supplied by the feed back means to produce the drive signal for the pump driver.

2. An optical amplifier according to claim 1, wherein the gain control means incorporates an adder for supplying the sum of the feed forward signal and the feed back signal as the drive signal to the pump driver.

3. An optical amplifier according to claim 1, wherein the feed back means is configured to compare the monitored output power $P_{out}$ to a set output power value $P_{set}$ dependent on a variable gain set value and to change the feed back signal in response to a difference between the monitored output power $P_{out}$ and the set output power value $P_{set}$.

4. An optical amplifier according to claim 1, wherein the feed forward means is configured to supply a feed forward signal dependent on a variable target gain value $G_{set}$ supplied to the amplifier.

5. An optical amplifier according to claim 4, wherein the feed forward means is configured to supply a feed forward signal from a look-up table or suitable algorithm selected on the basis of the variable target gain value $G_{set}$.

6. An optical amplifier according to claim 1, wherein the feed forward means is configured to supply a feed forward signal dependent on a variable target ASE compensation value $F_{ase}$ supplied to the amplifier.

7. An optical amplifier according to claim 6, wherein the feed forward means is configured to supply a feed forward signal from a look-up table or suitable algorithm selected on the basis of the variable target ASE compensation value $F_{ase}$.

8. An optical amplifier according to claim 1, wherein the feed forward means is configured to supply a feed forward signal dependent on a detected temperature value T.

9. An optical amplifier according to claim 1, wherein the feed forward means includes variable filter means for adjusting a digital sampling rate of the feed forward signal.

10. An optical amplifier according to claim 1, wherein the feed back means includes variable filter means for adjusting a digital sampling rate of the feed back signal.

11. An optical amplifier according to claim 1, wherein the feed forward means includes a logarithmic amplifier for supplying a feed forward signal dependent on the logarithm of the monitored input power $P_{in}$.

12. An optical amplifier according to claim 1, wherein the feed back means includes a logarithmic amplifier for supplying a feed back signal dependent on the logarithm of the monitored output power $P_{out}$.

13. An optical amplifier according to claim 1, wherein the or each detection means incorporates a tap-off coupler for tapping off a proportion of the optical signal.

14. An optical amplifier according to claim 1, wherein the amplifying means includes at least one erbium-doped fibre loop.

15. An optical amplifier according to claim 1, wherein the amplifying means includes at least one pump laser diode.

* * * * *